United States Patent [19]

Wollschleger

[11] 4,025,817
[45] May 24, 1977

[54] TRIGGER DEVICE FOR AN ELECTRONIC FLASH UNIT

[75] Inventor: Frank Dayton Wollschleger, Webster, N.Y.

[73] Assignee: Eastman Kodak Company, Rochester, N.Y.

[22] Filed: Jan. 12, 1976

[21] Appl. No.: 648,067

Related U.S. Application Data

[63] Continuation of Ser. No. 502,686, Sept. 3, 1974, abandoned.

[52] U.S. Cl. .................. 315/241 P; 310/8.2; 315/209 PZ; 315/263; 354/135; 361/264
[51] Int. Cl.² ................ G03B 15/03; H05B 41/32

[58] Field of Search ..... 315/241 R, 241 P, 209 PZ, 315/263; 354/126, 135, 142, 145; 317/81, DIG. 11; 310/8.2, 8.3, 8.7

[56] References Cited

UNITED STATES PATENTS

| | | | |
|---|---|---|---|
| 3,486,075 | 12/1969 | Steinke et al. | 317/81 |
| 3,782,258 | 1/1974 | Boekkool et al. | 354/126 |

*Primary Examiner*—Eugene R. La Roche
*Attorney, Agent, or Firm*—D. P. Monteith

[57] ABSTRACT

An electronic flash unit for use with a flash-trigger mechanism having a piezoelectric generator. An RF coil or inductor interconnects the piezo crystal and flash-trigger electrode and operates to modify the energy distribution of the piezo output pulse so as to more reliably fire the flashtube for a given amount of charge on the flash unit firing capacitor.

4 Claims, 4 Drawing Figures

TRIGGER DEVICE FOR AN ELECTRONIC FLASH UNIT

This application is a continuation of application Ser. No. 502,686 filed Sept. 3, 1974, now abandoned.

BACKGROUND OF THE INVENTION

1. Field of the Invention

This invention relates to an electronic flash unit and more particularly to an improved trigger circuit for use with a flash-firing mechanism having a piezoelectric generator.

2. Description of the Prior Art

Flash-firing mechanism which include a piezoelectric generator for triggering an electronic flash unit are known in the art. For example, U.S. Pat. No. 2,972,937 issued to C. G. Suits on Feb. 28, 1961, entitled FLASH APPARATUS discloses a piezoelectric crystal arranged to produce a high voltage impluse to fire a photoflash lamp in timed relation to light-unblocking movement of a camera shutter.

U.S. Pat. No. 3,782,258 issued to Boekkooi et al on Jan. 1, 1974, entitled IGNITION ARRANGEMENT FOR A DISCHARGE TUBE discloses a piezoelectric generator coupled to an electronic flash unit to initiate conduction of the xenon in the flashtube. In one embodiment disclosed therein, the piezo crystal output pulse is applied directly to the trigger electrode of the flashtube. In an alternative embodiment, the crystal pulse is applied to the gate electrode of an SCR which is turned ON to complete a conventional trigger circuit to energize the flashtube.

It has been found that the application of a piezo impulse directly to a flashtube trigger electrode as is done in the first embodiment disclosed in the Boekkooi et al patent does not always operate to fire the flashtube. This is despite the relatively high amplitude of the piezo pulse which may be several thousand volts. It has been theorized that due to the relatively short duration of this pulse, which may be on the order of approximately 5 microseconds or less, the flashtube interelectrode resistance is not sufficiently reduced. When this results, the flash-firing capacitor fails to discharge through the flashtube and a flash does not occur.

In the other embodiment disclosed in the Boekkooi et al Patent, the conventional flash-trigger circuit comprises a trigger capacitor, which may be charged to several hundred volts, in parallel with a trigger electrode transformer, the primary winding of which is in series with the aforementioned SCR. This circuit avoids the problem referred to hereinbefore associated with a direct application of the piezo pulse to the trigger electrode since such a pulse is used merely to switch the SCR ON to render the trigger circuit conductive, not to trigger the flashtube. When the SCR conducts, the trigger capacitor discharges through the primary winding which under the influence of the transformer induces a voltage on the trigger electrode. This voltage, although possibly not having the peak amplitude of a piezo pulse, has a longer duration related to the oscillations produced by the circuit capacitance and the secondary winding of the trigger electrode transformer and has been found to fire the flashtube in a highly reliable manner not possible when the crystal signal is applied directly to the trigger electrode. However, the latter arrangement suffers from the disadvantage that it is complex and expensive owning to the fact that a piezoelectric generator is used in combination with a conventional trigger circuit. One of the advantages of a piezo generator is that it replaces a large number of electrical components which comprise a conventional electronic trigger circuit and this advantage is lost with the aforementioned combination

SUMMARY OF THE INVENTION

One of the objects of the present invention is to provide an improved electronic flash unit.

Another object of the present invention is to provide an improved trigger mechanism for an electronic flash unit.

Another object of the invention is to provide an improved flash-trigger mechanism of the type which includes a piezoelectric generator.

Another object of the present invention is to provide an improved trigger mechanism of the aforementioned type which operates to more reliably initiate conduction of the flashtube.

A still another object of the invention is to provide an improved trigger circuit of the aforementioned type which includes a minimal number of additional elements and which can be efficiently manufactured at a low cost.

In accordance with the above objects, there is provided an improved electronic flash unit for use with a flash-trigger mechanism having a piezoelectric generator and means for actuating the generator to produce a piezo impulse signal, the flash unit having an electrical control device interconnecting the output electrode of the piezo crystal and the flash-trigger electrode and which operates to modify the energy distribution of the piezo pulse to more reliably fire the flashtube for given amounts of voltage on the flash-firing capacitor.

The invention, and its objects and advantages, will become more apparent in the detailed description of a preferred embodiment presented below.

BRIEF DESCRIPTION OF THE DRAWING

In the detailed description of a preferred embodiment of the invention presented below, reference is made to the accompanying drawing, in which.

DESCRIPTION OF A PREFERRED EMBODIMENT

Because electronic flash units are well known, the present description will be directed in particular to elements forming part of, or cooperating more directly with, apparatus in accordance with the present invention. It is to be understood that flash unit elements not specifically shown or described may take various forms well known to those having skill in the art.

Figure 1:
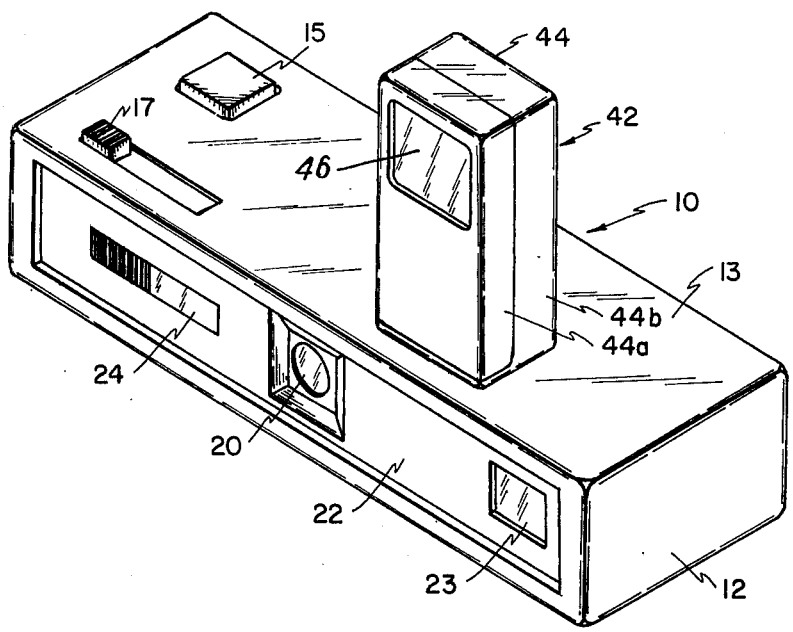
FIG. 1 illustrates a perspective view of a camera having an electronic flash unit mounted thereon.

There is shown in FIG. 1 of the drawing a camera, designated generally with numeral 10, having an enclosed generally light-tight housing 12, within the top wall 13 of which is located a shutter release member 15 and a knurled focus setting button 17 which is movable for focusing a taking lens (not shown) mounted within the housing in alignment with exposure aperture 20. Camera 10 also includes a shutter mechanism (not shown) located to regulate the amount of scene light projected through exposure aperture 20, the shutter being actuatable in response to a camera operator depressing shutter release member 15. Mounted within faceplate 22 is a viewfinder 23 and a window 24 behind which is located a light-sensitive device (not shown) such as a photocell for sensing the intensity of the scene light. Camera 10 may also include an electronic exposure control circuit operably associated with the photocell so as to automatically control the amount of scene light passing through aperture 20 once the shutter is opened under the influence of release member 15.

Figure 2:
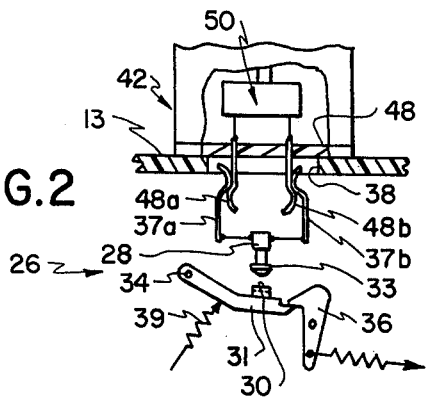
FIG. 2 illustrates a partial cross-section view of the camera and a side elevation view of the bottom portion of the flash unit with a portion of the sidewall of the flash unit removed to more clearly illustrate the electrical connection between a piezoelectric generator located in the camera and the flash unit.

As is shown in FIG. 2, there is located within camera 10 a flash-firing mechanism comprising a piezoelectric generator denoted generally 26 and which includes a piezoelectric crystal 28, a hammer 30 attached to a spring-biased lever 31 and an anvil 33 connected to the crystal and located adjacent the hammer. Lever 31, which is pivoted about a pivot 34, is releasably retained in a tensioned or cocked position by a springbiased pivotally mounted catch or latch member 36 which is operably coupled in a manner (not shown) to shutter release member 15. Crystal 28 is electrically connected to a pair of spaced, resilient electrical contacts 37a, 37b, the opposite ends of which are located within a flash-receiving socket or receptacle 38 formed within top wall 13. Receptacle 38 includes means (not shown) known in the art for releasably receiving and retaining a photographic flash array or electronic flash unit on camera 10 for the purpose of obtaining a flash photograph.

A piezoelectric generator for use in firing a photographic flash device is known in the art and has been described in several patents, one of which is the aforementioned Suits patent, and another of which is the aforementioned Boekkooi et al patent. When camera 10 is set or cocked for a picture-taking operation, lever 31 in a manner not shown is cocked in its tensioned position shown in FIG. 2 and when shutter release member 15 is actuated under light, operator finger pressure, latch 36 is caused to pivot in the clockwise direction as viewed in FIG. 2 to thereby release hammer 30 which strikes anvil 33 sharply under the influence of spring 39. When this happens, piezoelectric crystal 28 is elastically deformed which as is known in the art causes a short-duration, high voltage impulse 40, illustrated by the dashed lines in FIG. 4, to appear across its electrodes.

Figure 3:
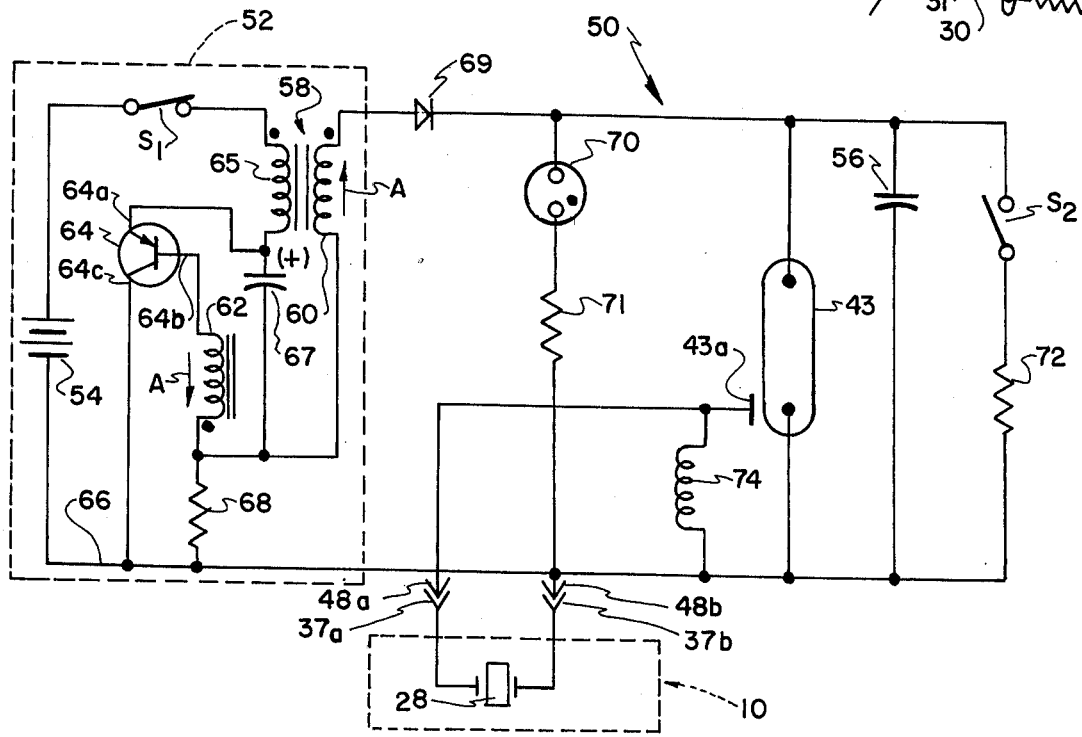
FIG. 3 is a schematic of an electronic circuit included in the flash unit shown in FIG. 1, which circuit in accordance with the teachings of the instant invention includes an improved trigger circuit for initiating conduction of the flash unit flashtube.

Returning to FIG. 1, there is shown an electronic flash unit 42 having an electronic flashtube 43, shown schematically in FIG. 3, mounted within housing 44 in optical communication with a flash window 46. Housing 44 is formed of a pair of complimentary shaped portions 44a, 44b which are releasably coupled together by suitable means such as screws (not shown) to permit an operator access to the inside of the flash unit. Means such as flash mounting base 48 shown in FIG. 2 depends from the bottom of housing 44 and is adapted to fit snugly into flash-receiving receptacle 38. Base 48 includes a pair of electrical conductive strips 48a, 48b spaced for making contact, respectively, with corresponding spaced contacts 37a, 37b to electrically couple flash unit 42 to generator 26.

For the purpose of firing flashtube 43 in response to each flash lamp firing signal generated by piezoelectric generator 26 at contacts 37a, 37b electronic flash unit 42 includes an internal circuit denoted generally 50, shown in FIG. 3, which circuit includes the instant invention and which will be readily understood by those skilled in the art from the following description read in conjunction with the drawing.

To obtain an adequate voltage potential for operating flashtube 43, a voltage converter circuit denoted generally 52 is provided which is adapted to step-up or convert the relatively low voltage of battery 54 to a level sufficient to adequately charge firing capacitor 56. Voltage converter 52 includes a transformer 58, the secondary winding of which comprises a high voltage winding 60 and a low voltage winding 62, and a transistor 64, the emitter electrode 64a being connected to transformer primary 65 as shown, base electrode 64b being connected in series to the low voltage winding 62 and collector electrode 64c being connected to common conductor 66. A control capacitor 67 is connected in parallel across the emitter-base junction of transistor 64 and winding 62 as shown and operates due to the high impedance combination of battery 54 current limiting resistor 68 and primary 65 to provide positive feedback to emitter electrode 64a of the base electrode current.

To charge capacitor 56, normally open switch S1 is closed This can be done automatically such as by locating switch S1 on the bottom of flash unit 42 where it can be engaged by wall 13 and closed when the flash unit is inserted into socket 38. With this arrangement, the switch opens automatically when flash unit is disconnected from the camera and unnecessary battery current drain is avoided when the flash is not being used. When switch S1 is closed, current is caused to flow from battery 54 through primary 65. Initially, the portion of the battery voltage which appears across primary 65 is relatively small and only a slight amount of current is caused to flow through each of the secondary windings in the direction of arrow A. As this occurs, a portion of the current through winding 62 is fed back through capacitor 67 and into emitter electrode 64a. As this happens, transistor 64 is rapidly driven into saturation and the voltage across primary 65 approaches a constant equal approximately to the level of the battery voltage. For this condition to be maintained, the flux produced by primary coil 65 must increase linearly, or, in other words, current which constantly increases in amplitude must be drawn from battery 54. Since battery current is limited, constantly increasng battery current is maintained only for a brief duration during which capacitor 67 is charged with a polarity as shown, and a high voltage pulse is produced across widing 60 which pulse operates to cause control diode 69 to conduct and to thereby charge firing capacitor 56.

Once battery current ceases to increase, the flux field produced by winding 65 collapses and consequently a voltage of opposite sense is instantaneously induced across the secondary windings of transformer 58. When this happens, it is necessary, in order to fully understand the operation of circuit 52, to consider two conditions which occur. First, because of the series interconnection between control diode 69 and winding 60, the diode does not conduct and firing capacitor 56 is not charged. Secondly, capacitor 67 discharges through transistor 64 to thereby cause base current to flow through secondary winding 62 in the direction of arrow A. As this happens, positive feedback again occurs through capacitor 67 and the cycle is repeated. The net result is that a series of positive, repetitive pulses is produced across winding 60 which repetitively turn diode 69 ON and charge capacitor 56. The repetition rate of the pulsed signal is selectively controlled by the value of the elements of circuit 52 and capacitor 56 is charged at a rate in proportion to its capacitance.

A voltage sensitive indicator such as a neon lamp 70 is connected in series with a fixed resistor 71, the series combination being connected in parallel across firing capacitor 56. The operational parameters of lamp 70 and resistor 71 are selectively controlled such that when firing capacitor 56 is charged to a level sufficient to properly fire flashtube 43, lamp 70 is caused to glow so as to be visible through a flash-ready window (not shown) located in the rear of flash unit 42 to indicate to a camera operator the flash unit is ready to be fired.

As a safety means for discharging the relatively high voltage to which capacitor 56 is charged, on such occasions as when the flash unit operator may deem it necessary to separate housing portions 44a, 44b for access to the inside of flash unit 44, there is provided a bleeder resistor 72 connected in series to a normally open switch S2, the series combination being connected in parallel across firing capacitor 56. Switch S2 may for example comprise a resilient conductive strip, one end of which is connected to resistor 72 and the other end of which is held out of contact with capacitor 56 by means as a rigid finger member (not shown) connected internally to one portion of housing 44. When the housing is opened, the finger is displaced to permit the conductive strip to contact capacitor 56 so as to discharge capacitor 56 through resistor 72 to conductor 66.

The conduction of flashtube 43 is commenced upon the application of a voltage signal to trigger electrode 43a. This latter condition occurs when piezoelectric crystal 28 is deformed through the action of hammer 30. This signal causes some of the xenon in the tube to be ionized, which operates to sharply reduce the inter-electrode resistance of flashtube 43. When this happens, firing capacitor 56 is caused to rapidly discharge through the flashtube. The result is a brief flash, on the order of a millisecond, of high intensity light.

In accordance with the teachings of the present invention, circuit 50 includes means operatively coupled between the output contacts 37a, 37b of piezoelectric generator 26 and trigger electrode 43a which in combination with crystal 28 operates to provide an improved trigger mechanism or circuit for initiating firing of flash unit 42. I have found by electrically connecting an RF coil inductor 74 between electrode 43a and conductor 66 in parallel across crystal 28, that improved triggering of flashtube 43 occurs. That is, I have found by utilizing inductor 74 as shown it is possible to fire flashtube 43 more reliably, that the flashtube can be properly fired with a lower voltage charge on firing capacitor 56 than when the inductor is not utilized and that overall a trigger circuit results which is less sophisticated than trigger circuits known in the prior art of comparable performance capability. Specifically I have found that when using a flashtube of the type produced by the Elevam Corp., and a piezoelectric crystal of the type sold by the General Electric Corp. that an inductor of approximately 10 millihenries produces the most satisfactory results. With this combination, I have found that a trigger electrode signal is produced illustrated by the solid lined curve shown in FIG. 4 and denoted 76. With signal 76, I have found flash unit 42 is reliably fired even when firing capacitor is only charged, for example, to approximately 240 volts whereas I have found with signal 40 that a 240-volt charge on capacitor 56 is not adequate to fire flashtube 43 reliably over a number of flash-firing operations and that acceptable flashtube illumination occurs with the latter trigger signal only in approximately 5 percent of such firing operations. To obtain the same degree of reliability with a piezoelectric generator absent the inductor, I have found it necessary to charge the firing capacitor to at least approximately 265 volts.

To be able to fire flashtube 43 with a lower flash-firing voltage is important for several reasons. One of these reasons is that the flash unit recycle time, that is, the time required to recharge the firing capacitor following a flash-firing operation, is reduced. Consequently, the time between successive flash photographs which is limited by the recycle time can be lowered.

A further reason is that battery operational life is extended. Battery voltage remains approximately constant over a particular operational time interval, then begins to gradually drop or fall-off when the battery is used beyond this time. Design considerations allow for a certain voltage drop since the voltage converter circuit can provide a larger voltage signal adequate to charge the firing capacitor. This can be done only within certain battery voltage limits beyond which it is not possible to adequately charge the firing capacitor. With the improved trigger circuit constituting the instant invention, some additional battery voltage decay is permissible which thereby permits a longer useful battery life.

Figure 4:
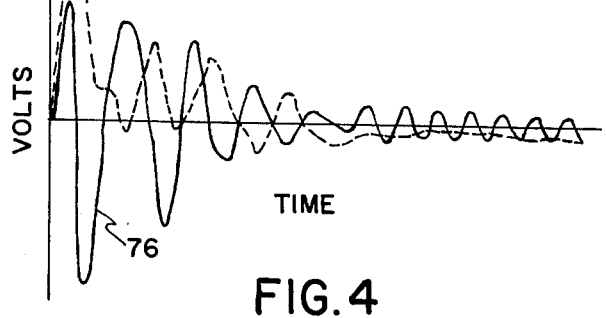
FIG. 4 is a graphic illustration showing with the dashed lines a flash unit trigger signal which is produced utilizing a particular type of prior art piezoelectric trigger mechanism and showing with the solid line the flash unit trigger signal with the improved trigger mechanism which constitutes the present invention.

It is known in the art that the equivalent circuit of a piezoelectric crystal exhibits an equivalent electrical circuit having inductive, capacitive, and resistive characteristics in various proportions which are related to the kind of crystal, the way the crystal is cut and its effective dimensions. Such an equivalent circuit may have natural frequencies ranging from a few thousand cycles to several megacycles. Although the equivalent circuit of the crystal I have selected is not known, I have found that improved performance results with an inductor having an inductance of between approximately 5 to 20 millihenries with the most satisfactoy performance resulting with an inductor of 10 millihenries. With that inductor and the crystal I have selected to use, the reactance of the inductor combines with the capacitive reactance of the crystal and flashtube in such a manner that the resonant frequency of the trigger circuit is modified to produce trigger electrode signal 76 as is shown in FIG. 4. It is noted in that illustration that the frequency content or spectrum of signal 76 differs from the frequency spectrum of signal 40, owing to the fact that the resonant frequency of the trigger mechanism has changed. If an envelope of the respective curves is considered, there is less total energy in the initial portion of signal 76 but that the intermediate and tail portions of the envelope of signal 76 include a larger overall energy level than that of the envelope of the prior art piezoelectrode trigger signal 40. Although it is not known exactly how the improved performance results, one theory that has been advanced is that the improved trigger signal has an energy level adequate to ionize the xenon gas over a longer period of time than that of the prior art signal which has a greater proportion of energy concentrated in a brief, initial period of the signal. This more even distribution of energy operates to more completely ionize the xenon which permits the flashtube to fire with a reduced charge on the firing capacitor.

In accordance with a preferred embodiment of the instant invention, there has been described an improved electronic flash unit trigger circuit. Although the invention has been described in detail with particular reference to a preferred embodiment thereof, it will be understood that variations and modifications can be effected within the spirit and scope of the invention.

I claim:

1. In an electronic flash unit including first and second electrical conductors, a flashtube containing an ionizable gas having (1) a normal, first state in which said gas constitutes an electrically non-conductive medium, and (2) an ionized, second state in which said gas constitutes an electrically conductive medium, said flashtube further including two opposed primary electrodes and an external trigger electrode responsive to an electrical trigger-control signal for ionizing said flashtube gas, said trigger electrode being connected to said first electrical conductor and one of said primary electrodes being connecteed to said second conductor, an improved trigger mechanism for said electronic flash unit comprising:
   a. a piezoelectric generator having first and second electrical output contacts coupled to said first and second conductors, respectively; and
   b. an inductor interconnecting said first and second output contacts, said inductor having an inductance of a magnitude for producing upon actuation of said piezoelectric generator a trigger-control signal having a series of oscillations that occur over an extended period of time, said trigger-control signal being effective to change said flashtube gas from said first state to said second gate to produce an electrically conductive path between said primary electrodes.

2. In an electronic flash unit including first and second electrical conductors, a flashtube containing ionizable gas having (1) a normal, first state in which said gas constitutes an electrically non-conductive medium, and (2) an ionized, second state in which said gas constitutes an electrically conductive medium, said flashtube including two primary electrodes, and an external trigger electrode responsive to an electrical trigger-control signal for ionizing said flashtube gas, said trigger electrode being connected to said first electrical conductor and one of said primary electrodes being connected to said second conductor, an improved trigger mechanism for said electronic flash unit comprising:
   a. a piezoelectric generator including a piezoelectric crystal having first and second output contacts connected to said first and second conductors, respectively, said crystal having a particular equivalent electrical impedance characteristic; and
   b. electrical control means connected between said first and second electrical conductors, said control means having a predetermined reactive impedance characteristic for forming a resonant electrical circuit with said piezoelectric crystal, said resonant circuit operating to produce an oscillatoy signal having an extended period in which oscillations occur to convert said flashtube gas from said first state to said second state to provide an electrically conductive path between said primary electrodes.

3. In an electronic flash unit including a flashtube containing an ionizable gas having (1) a normal, first state in which said gas constitutes an electrically non-conductive medium and (2) an ionized second state in which said gas constitutes an electrically conductive medium, said flashtube further including (1) an external trigger electrode responsive to an electrical trigger signal for ionizing said flashtube gas, and (2) two primary electrodes, an improved trigger mechanism for said electronic flash unit comprising:
   a. a piezoelectric crystal having a particular equivalent electrical impedance characteristic;
   b. means electricaly coupling said piezoelectric crystal to said trigger electrode and one of said primary electrodes;
   c. auxiliary electrical control means having an impedance characteristic for effectively forming a resonant circuit in combination with said piezoelectric crystal, said resonant circuit operating to produce upon actuation of the piezoelectric crystal an oscillatory voltage signal having an extended period in which oscillations occur; and
   d. means for supplying said oscillatory voltage signal to said trigger electrode, said oscillatoy signal being effective to change said flashtube gas from said first state to said second state to establish an electrically conductive path between said primary electrodes 4. In an ignition arrangement for a discharge tube containing an ionizable gas having (1) a normal, first state in which said gas constitutes an electrically non-conductive medium, and (2) an ionized second state in which said gas constitutes an electrically conductive medium, said flashtube further including (1) an external trigger electrode responsive to an electrical signal for ionizing said gas, and (2) two primary electrodes, an improved mechanism for ionizing said gas comprising:
   a. a piezoelectric crystal, having a particular equivalent electrical impedance characteristic, for producing an electrical voltage signal;
   b. electrical control means having an electrical impedance for effectively forming a resonant circuit in combination with said piezoelectric crystal to produce an oscillatory voltage; and
   c. means for applying said oscillatory voltage to said trigger electrode to change said gas from said first state to said second state whereby an electrically conductive path between said primary electrodes is reliably established.

* * * * *

UNITED STATES PATENT OFFICE
CERTIFICATE OF CORRECTION

Patent No. 4,025,817                    Dated May 24, 1977

Inventor(s) Frank D. Wollschleger

It is certified that error appears in the above-identified patent and that said Letters Patent are hereby corrected as shown below:

On the title page please delete "TRIGGER DEVICE FOR AN ELECTRONIC FLASH UNIT" and substitute therefor --AN IMPROVED PIEZOELECTRIC TRIGGER DEVICE FOR AN ELECTRONIC FLASH UNIT--.

In Column 1, line 1 please delete "TRIGGER DEVICE FOR AN ELECTRONIC FLASH UNIT" and substitute therefor --AN IMPROVED PIEZOELECTRIC TRIGGER DEVICE FOR AN ELECTRONIC FLASH UNIT--; line 15 please delete "mechanism" and substitute therefor --mechanisms-- line 20 please delete "impluse" and substitute therefor --impulse--; line 69 please delete "owning" and substitute therefor --owing--. In Column 3, line 31 please delete "springbiased" and substitute therefor --spring-biased--. In Column 4, line 35 please insert "." after the word "closed"; line 61 please delete "widing" and substitute therefor --winding--. In Column 5, line 58 please delete "circuiit" and substitute therefor --circuit--. In Column 6, line 50 please delete "circuiit" and substitute therefor --circuit--; line 53 please delete "satisfactoy" and substitute therefor --satisfactory--. Column 7, line 31 please delete "connecteed" and substitute therefor --connected--; line 44 please delete "gate" and substitute therefor --state--. In Column 8, line 8 please delete "oscillatoy" and substitute there for --oscillatory--; line 36 please delete "oscillatoy" and substitute therefor --oscillatory--.

Signed and Sealed this

Twenty-seventh Day of September 197

[SEAL]

Attest:

RUTH C. MASON
Attesting Officer

LUTRELLE F. PARKER
Acting Commissioner of Patents and Trademark